United States Patent [19]

Hansson

[11] 4,218,319
[45] Aug. 19, 1980

[54] METHOD AND A DEVICE FOR AUTOMATIC CLEANING OF TRASHRACKS AT WATER INTAKES FOR WATER POWER PLANTS AND SIMILAR

[76] Inventor: Hans Hansson, Mölneby. Basgården, Överlida, Sweden, 510 60

[21] Appl. No.: 9,048

[22] Filed: Feb. 2, 1979

[30] Foreign Application Priority Data

Feb. 10, 1978 [SE] Sweden ................................ 7801549

[51] Int. Cl.² .......................................... B01D 35/16
[52] U.S. Cl. .................................................. 210/159
[58] Field of Search ................ 210/79, 154, 159, 162, 210/527

[56] References Cited

U.S. PATENT DOCUMENTS

| | | | |
|---|---|---|---|
| 2,904,181 | 9/1959 | Baher et al. | 210/159 |
| 2,978,105 | 4/1961 | Poheim | 210/159 |
| 3,093,580 | 6/1963 | Siewert | 210/159 |
| 3,355,022 | 11/1967 | Nordell | 210/162 |
| 3,482,698 | 12/1969 | Ostnas | 210/159 |
| 3,909,411 | 9/1975 | Angele et al. | 210/159 |

Primary Examiner—Theodore A. Granger
Attorney, Agent, or Firm—Holman & Stern

[57] ABSTRACT

The invention provides a device for automatic cleaning of trashracks. The device comprises a rake arm upheld by a support which is movable sideways in parallel with the trashrack. A wedge-shaped rake is pivotally mounted at the lower end of the rake arm, which by drive means is moved downwards and upwards along the trashrack, the rake thereby engaging the trashrack. During the downward movement the rake engages the trashrack only with its lower edge at which means are arranged striving to pivot the rake towards the trashrack. During the upward movement the rake is pressed against the trashrack with the whole end surface facing the trashrack.

3 Claims, 4 Drawing Figures

FIG. 3
FIG. 4
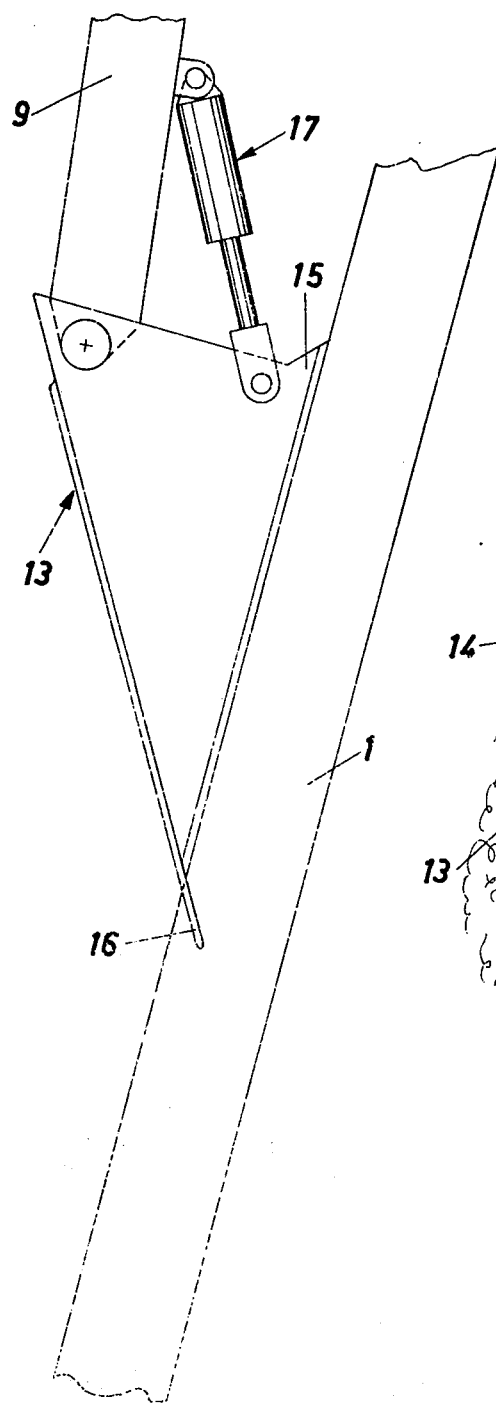
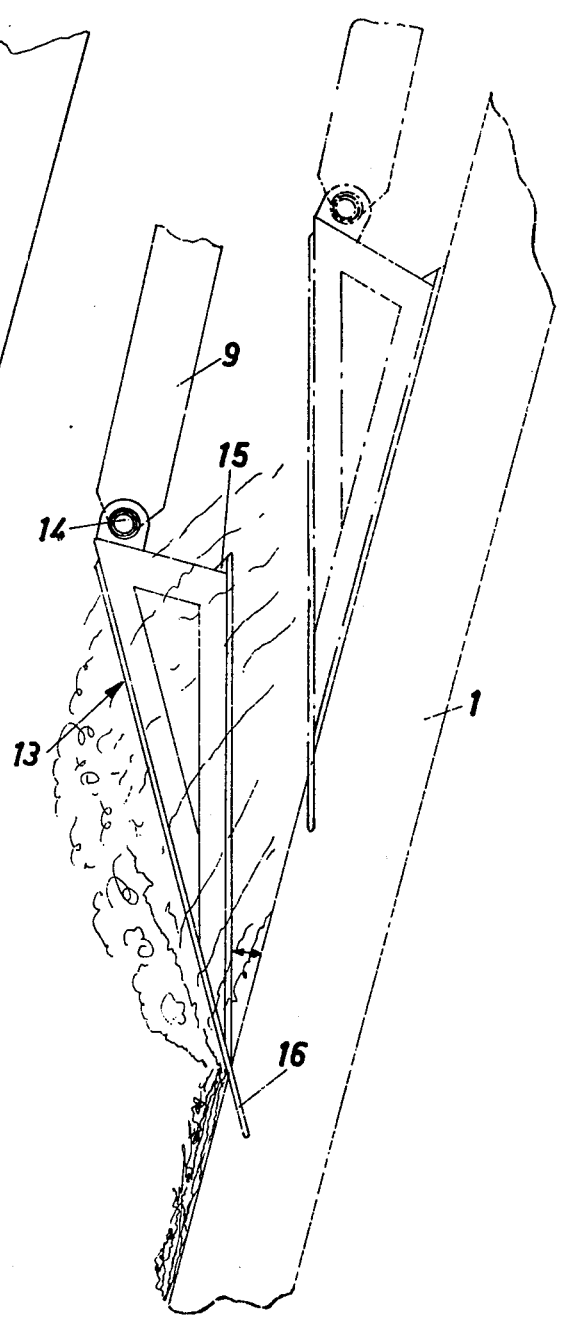

METHOD AND A DEVICE FOR AUTOMATIC CLEANING OF TRASHRACKS AT WATER INTAKES FOR WATER POWER PLANTS AND SIMILAR

BACKGROUND OF THE INVENTION

The present invention refers to a device for automatic cleaning of trashracks at turbine intakes, fresh water intakes, waste water purifying plants and similar, at which a substantially wedge-shaped rake pivotally mounted at the end of a rake arm by driving means is moved together with the rake arm downwards and upwards along the trashrack, said rake arm transferring pulling and pushing forces from the driving means to the rake, the rake arm being mounted to a support, which is displaceable sideways in parallel with the trashrack.

At trashracks trash of different kind, e.g. leaves, water plants and similar, is gathered at which a recurrent cleaning of the trashrack has to be made. In earlier days this cleaning was made manually by means of special rakes, which however was a heavy and physically trying work and besides almost impossible to perform at modern water power plants because of the high trashracks and great water depths occuring there. Therefore automatic raking equipments are nowadays used to a great extent.

In the Swiss patent specification No. 396.779 such a device is described, where a carriage hanging in a lift rope is moved down and up along a trashrack by rolling on the bars of the trashrack. The carriage is provided with teeth extending in between the bars of the trashrack. A bucket is hingedly mounted to the carriage, which bucket during the upward movement of the carriage collects the trash which has been gathered at the trashrack and which during the downward movement is pivoted away from the trashrack. Such a device hanging in ropes is easily effected by side streams, which can occur at trashracks partly blocked up. Besides that no pushing force can be transferred to the carriage during its downward movement. Therefore it would be very difficult to penetrate e.g. an ice layer with this device.

In the Swedish patent specification No. 302.430 is described a raking device comprising a rake member mounted at the end of a rake arm, which can be moved up and down along the trashrack and which is upheld by a support displaceable lengthwise of the trashrack. The rake makes by hydraulic means a cyclic movement, at which the rake arm is lowered to the bottom of the trashrack with the rake at a distance from the trashrack, the rake is then pressed against the trashrack and the rake arm is lifted, at which the rake broughts with the trash gathered at the trashrack and delivers it in a chute or similar above the trashrack. The support is moved sideways and the procedure is repeated until the whole trashrack has been cleaned.

With this device a cleaning of the trashrack is performed only at the upward movement of the rake, at which all trash gathered in front of the trashrack is lifted by the rake and is delivered in e.g. a chute. Especially when the amount of trash is large a lot of power is required for lifting the rake and the device is exerted to considerable stress. A great deal of the trash gathered at the trashrack consists of small soft objects as leaves and plants, which do not cause any damage on e.g. turbines and therefore could be allowed to pass the trashrack.

SUMMARY OF THE INVENTION

On the basis of this fact and in order to reduce the power consumption of the raking device and the stress exerted thereto the wedge-shaped rake according to the present invention engages the trashrack both during its upward and its downward movement, at which the rake during its upward movement is pressed against the trashrack with its end surface facing the trashrack and during its downward movement engages the trashrack only with its lower end thereby making an acute angle with the trashrack.

Thus during its downward movement the rake shoves away the trash gathered at the trashrack, whereupon a part of it can pass in between the bars of trashrack and a part is again gathered in front of the trashrack. This part of the trash which does not pass the trashrack is brought with the rake during its upward movement and is delivered in a chute or similar in the usual way. The amount of trash that has to be lifted by the raking device is considerably reduced. Owing to the fact that the rake during its downward movement engages the trashrack only with its lower end, the friction between the rake and the trashrack is reduced. The wedge-shaped rake can also penetrate e.g. an ice layer by means of the pushing force transferred by the rake arm.

The invention also provides a device for performing the above described procedure, said device comprising a support arranged above the trashrack and being moveable sideways in parallel with the trashrack, said support upholding a rake arm at the lower end of which a rake is pivotally mounted, drive means being arranged to move the rake arm with the rake upwards and downwards along the trashrack, said rake being wedge-shaped with scraping edges at its upper and lower edges facing the trashrack, means being arranged striving to pivot the rake towards the trashrack with its lower edge.

BRIEF DESCRIPTION OF THE DRAWINGS

FIG. 3 is a side view showing the rake during its upward movement, and

FIG. 4 is a side view of another embodiment of the rake during its downward and upward movement resp.

DESCRIPTION OF THE PREFERRED EMBODIMENTS

Figure 1:
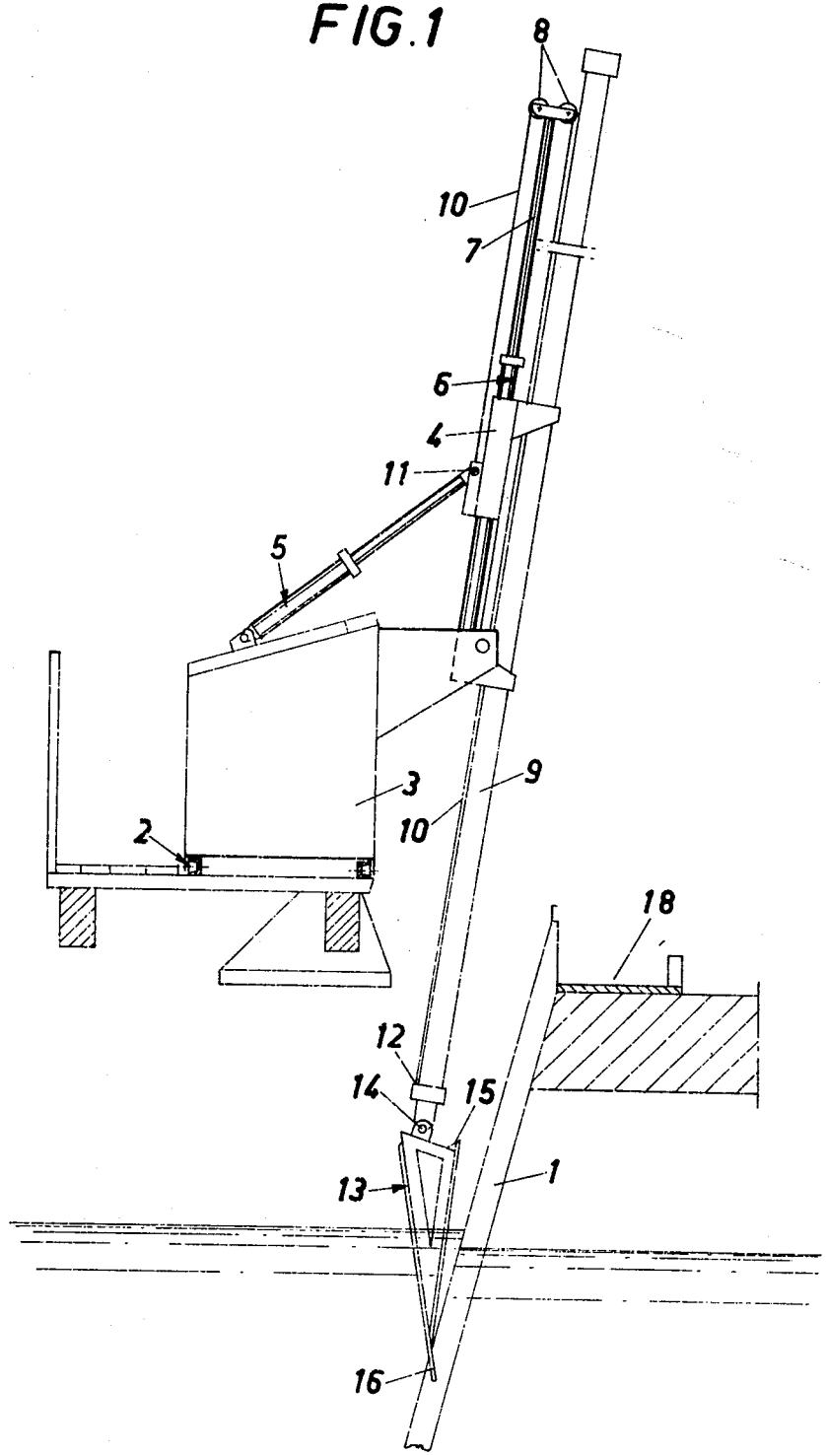
FIG. 1 is a side view showing the raking device mounted at a trashrack.

The trashrack 1 is usually placed with an inclination in front of the water intake. When the trashrack 1 is blocked by trash the water level outside the trashrack rises, at which different water levels are obtained outside and inside the trashrack, which is shown in FIG. 1. In order to avoid troubles caused by this, e.g. risk for flooding and a decreased available power in the water power plant the trashrack 1 has to be cleaned. A track 2 for a carriage 3 is arranged in parallel with the trashrack 1, said carriage 3 thereby being displaceable sideways along the trashrack. At the upper part of the carriage 3 a guide 4 is pivotally mounted, which by means of a hydraulic cylinder 5 can be brought into different inclinations relative to the carriage 3. The guide 4 has a double function, on one hand it serves as a support for a second hydraulic cylinder 6 arranged in parallel with the guide 4 and on the other hand it is arranged to guide a rake arm 9 which can be moved upwards and downwards. Pulleys 8 are arranged at the free end of the piston rod 7 of the cylinder 6. A further pulley (not shown) is arranged at the guide 4, said pulley together with the pulleys 8 forming a block means, which by means of a wire 10 exchanges the stroke of the piston. The wire 10 is with one end attached to the guide 4 at the attachment point 11 and with the other end at the lower end of the rake arm 9 at the attachment point 12.

A rake 13 is attached at the lower end of the rake arm 9. The rake 13 is pivoted about the shaft 14.

Figure 2:
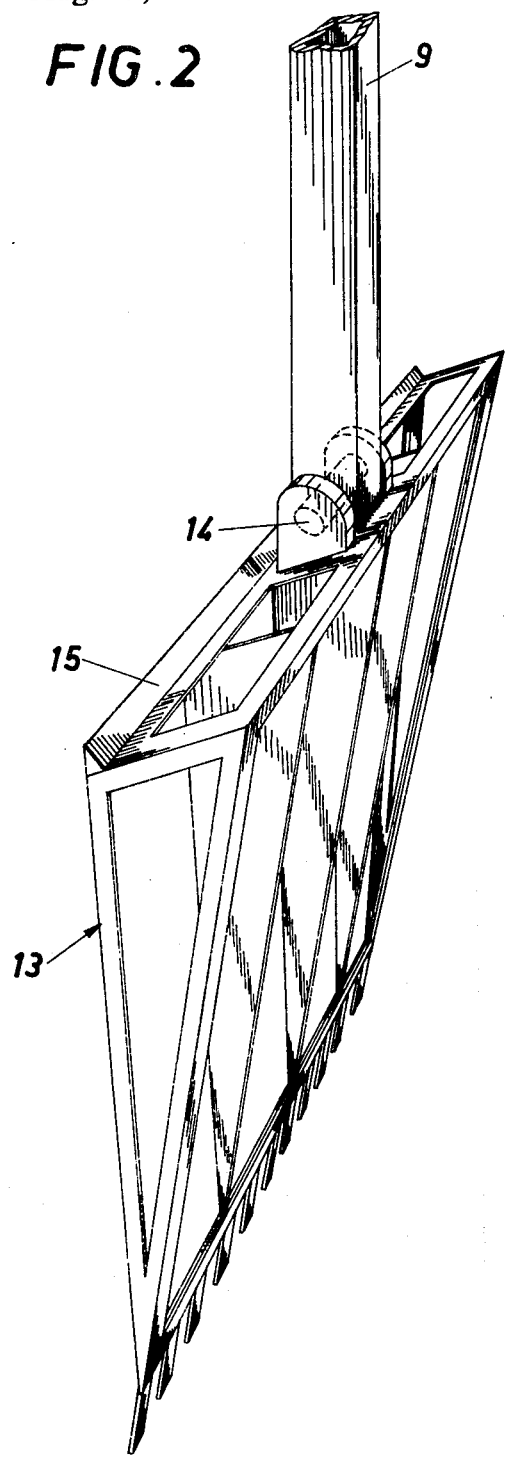
FIG. 2 is a perspective view of the rake.

An embodiment of the rake is shown in FIG. 2. The rake 13 comprises a wedge-shaped frame structure, which at its upper edge facing the trashrack 1 is provided with an upper scraping edge 15 and at its lower edge is provided with a number of scraping teeth 16, the distance between which correspond to the distance between the trashrack bars. Since the rake only comprises a frame structure, through which the water can pass, a lower water resistance is obtained.

The rake 13 strives to pivot towards the trashrack 1 by means of a prestressing member. Said prestressing member can comprise a hydraulic cylinder 17, which is pivotally attached to the rake arm 9 close to its lower end and to the rake 13, as is shown in FIG. 3. By retracting the piston of the cylinder 17 the rake 13 is pivoted about the shaft 14 towards the trashrack 1. In the embodiment according to FIG. 2 the shaft 14 is spring-loaded, said spring constituting the prestressing member. It is also possible to stretch a wire of r similar between the rake 13 and the rake arm 9, said wire by means of spring force striving to pivot the rake 13 towards the trashrack 1.

The raking device works in the following way. The device is started automatically by means of a level indicator, which is actuated by the level difference in front of and behind the trashrack 1. When the work cycle starts a pressure is obtained on the underside of the piston in the cylinder 5, at which the guide 4 together with the rake arm 9 is pivoted in clockwise direction according to FIG. 1 and the rake is brought a short distance away from the trashrack 1. However the spring-loaded shaft 14 (or the piston of the cylinder 17 e.g.) pivots the rake 13 towards the trashrack 1, so that the lower edge of the rake with the scraping teeth 16 contacts the trashrack 1 and reaches in between the trashrack bars.

At the same time as the cylinder 5 is actuated pressure medium is also delivered to the cylinder 6, which lowers the rake arm 9 with the rake 13 to the lower edge of the trashrack 1. In FIG. 1 and with continuous lines in FIG. 4 the rake is shown during its downward movement. During this movement the rake 13 shoves away the trash that has been gathered in front of the trashrack 1, as is shown in FIG. 4. A part of the trash passes through the trashrack, another part is again gathered in front of the trashrack and a part may float up to the surface, from which it easily can be removed.

When the rake 13 has reached its bottom position the guide 4 together with the rake arm 9 is by means of the piston of the cylinder 5 pivoted in counter-clockwise direction, so that the rake 13 is pressed against the trashrack 1. After that the rake arm 9 with the rake 13 is moved upwards by means of the piston of the cylinder 6, as is shown in FIG. 3 and with dash dotted lines in FIG. 4. During this upward movement the rake 13 removes the trash which is still left in front of the trashrack 1. The scraping edge 15 is operating during this phase. The trash is delivered in a chute 18 behind the trashrack 1. When the rake 13 has delivered the trash the device is moved sideways along the track 2 a distance corresponding to the width of the rake and a new work cycle can start.

The invention is of course not limited to the above described and in the drawings shown embodiments, but can be varied within the scope of the claims.

I claim:

1. A device for automatic cleaning of trashracks at turbine intakes, fresh water intakes, waste water purifying plants and the like, said device comprising a support arranged above the trashrack and being moveable sideways in parallel with the trashrack, said support upholding a rake arm, a substantially wedge-shaped rake pivotally mounted at the lower end of the rake arm, said rake having scraping members at its upper and lower edges facing the trashrack, drive means on said support arranged to move the rake arm with the rake from a position above the water surface to a position at the lower end of said trashrack, then to press the rake against the trashrack and move it upwards along the trashrack with the upper scraping member of the wedge-shaped rake facing the trashrack in sliding engagement with the bars of said trashrack to an emptying position above the trashrack, said rake arm transferrng pulling and pushing forces from the drive means to the rake, and means to pivot the lower edge of the rake towards the trashrack so that during its downward movement the rake makes an acute angle with the trashrack and engages the trashrack with its lower scraping members and pushes away trash gathered at the trashrack.

2. The device as claimed in claim 1, wherein said means comprises a spring-loaded shaft, which constitutes the pivot connection between the rake and the rake arm.

3. The device as claimed in claim 1, wherein said means comprises a pressure medium cylinder attached between the rake arm and the upper end of the rake.

* * * * *